April 4, 1933.   A. B. CODLING   1,903,324
ELECTRIC BROILER
Filed June 6, 1931   2 Sheets-Sheet 1

INVENTOR
Allen Byron Codling
BY
Fred C. Matheny
ATTORNEY

April 4, 1933. A. B. CODLING 1,903,324
ELECTRIC BROILER
Filed June 6, 1931 2 Sheets-Sheet 2
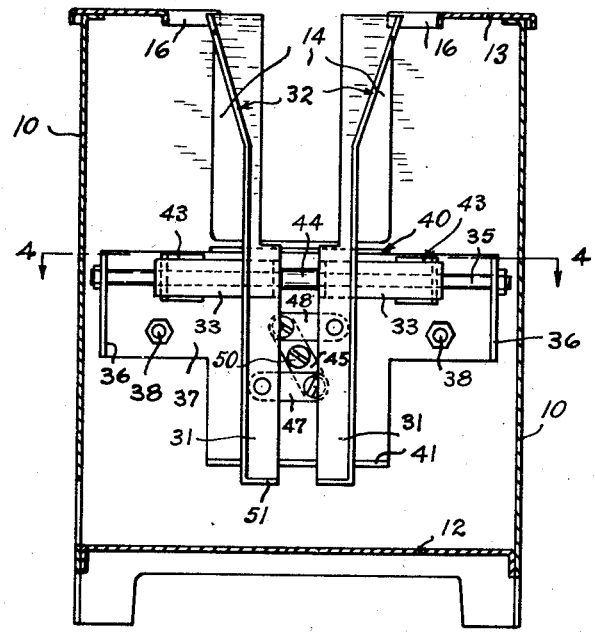
Fig. 3
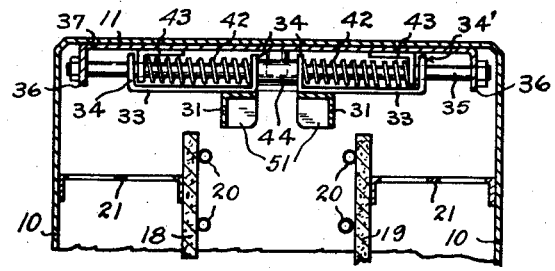
Fig. 4
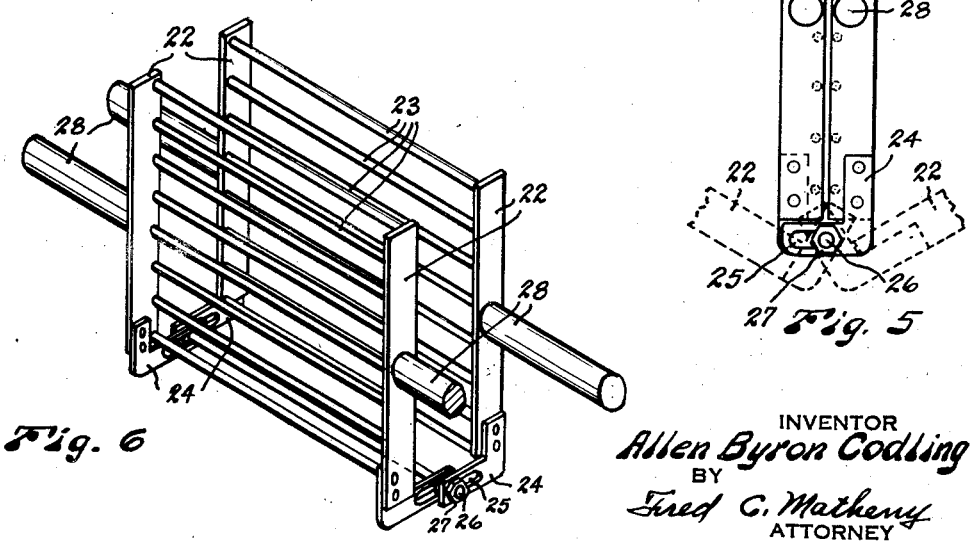
Fig. 5
Fig. 6
INVENTOR
Allen Byron Codling
BY
Fred C. Matheny
ATTORNEY Patented Apr. 4, 1933

1,903,324

UNITED STATES PATENT OFFICE

ALLEN BYRON CODLING, OF SEATTLE, WASHINGTON

ELECTRIC BROILER

Application filed June 6, 1931. Serial No. 542,533.

My invention relates to electric broilers for broiling meats, fish and like food, and the general objects of my invention are to provide an electric broiler which is simple in construction, reliable and efficient in operation and not expensive to manufacture.

An important object of my invention is to provide an electric broiler having a readily removable folding grill member adapted to receive and hold pieces of food of variable thickness and having means for receiving and holding and automatically positioning said grill member so that the food therein will always be supported mid way between two upright spaced apart heating elements whereby the said food will be subjected to equal heat on both sides.

Another object of the invention is to provide a grill member composed of two grill plates pivotally and adjustably connected at one edge whereby they may be opened up like a book to receive a piece of material to be grilled and whereby they will automatically adjust themselves to material of different thickness, said grill members having two parallel handles extending outwardly from each end and the ends of the housing having cut away portions extending from the top edge downwardly for receiving said handles.

A further object is to provide resilient means within the housing for pressing the grill plates firmly against the food while it is being cooked.

A further object of the invention is to provide an electric broiler which may be cheaply made in smaller sizes for individual and family use on ordinary household lighting circuits.

Other and more specific objects will be apparent from the following description taken in connection with the accompanying drawings.

In the accompanying drawings Figure 1 is a perspective view of an electric broiler constructed in accordance with my invention showing the grill member therein.

Fig. 3 is a cross section substantially on broken line 3—3 of Fig. 1, the grill member and drip pan being removed.

Fig. 4 is a fragmentary sectional view substantially on broken line 4—4 of Fig. 3.

Fig. 5 is a detached end elevation of the folding grill member showing the two grill plates close together.

Fig. 6 is a detached perspective view of said grill member, showing the two grill plates spread apart.

Like reference numerals designate like parts throughout the several views.

Figure 1:
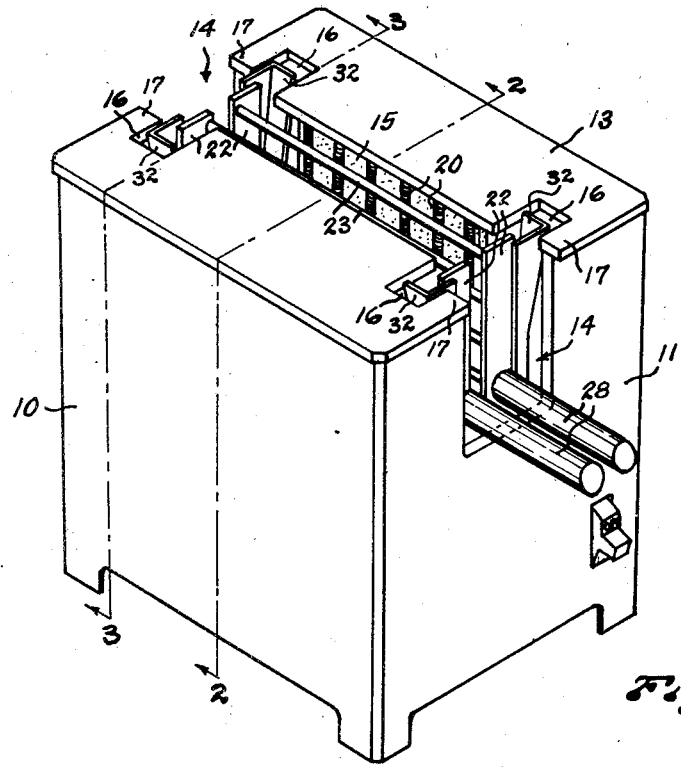

Referring to the drawings, I show a broiler embodying a rectangular housing having side walls 10, end walls 11, bottom 12 and a two piece top 13 which may all be formed of sheet metal and secured together in any convenient way to afford a rigid and substantial construction. The end walls 11 are cut away to form handle receiving openings 14 which extend from the top downwardly for a substantial distance to afford clearance for the handles of a grill member hereinafter described. The top 13 is formed of two symmetrical pieces which are spaced apart to afford a longitudinally extending slot 15 of sufficient width to permit insertion and removal of the grill member in its most widely spread apart position. The slot 15 is disposed mid way between the two sides of the housing. The two parts of the top 13 are further transversely notched near each end as at 16 and the portions 17 of said top pieces which lie between the notches 16 and the ends of the pieces are cut back further than the edges thereof which lie adjacent the slot 15, as more clearly shown in Fig. 1.

Within the broiler housing and on opposite sides of the slot 15 are two upright parallel plates 18 and 19 of refractory insulating material having electric heating coils 20 supported on the sides thereof which are turned toward each other and toward the slot 15. The electric heating coils 20 are electrically connected in the usual manner with a source of supply of electric current. The refractory plates 18 and 19 terminate short of the end walls of the housing and are herein shown as supported in spaced relation from the side walls of the housing by perforated brackets 21 said perforated brackets affording a free circulation of air.

Figure 2:
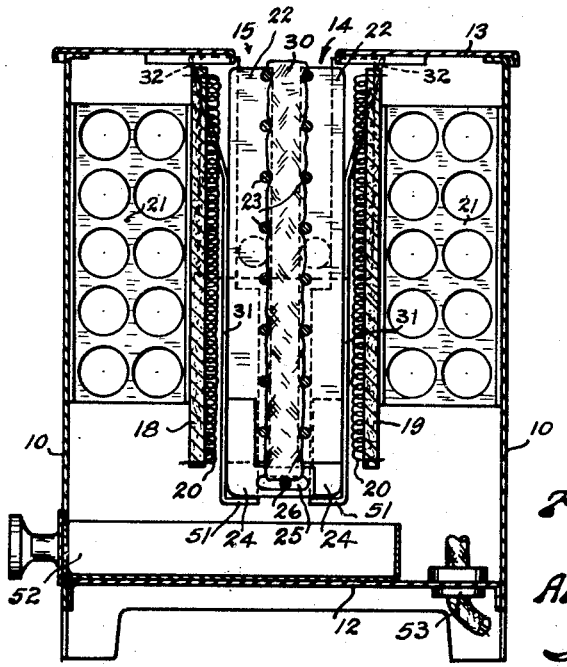
Fig. 2 is a cross section of the same substantially on broken line 2—2 of Fig. 1, showing a piece of food supported in the grill member in the correct position for broiling.

The folding grill member, Figs. 2, 5 and 6, consists of two open work grill plates of similar construction each formed of two normally upright end members 22 between which extend a plurality of spaced apart rods or bars 23, which are rigidly connected with the end members 22. Each end member 22 has a pivot bracket 24 at the lower end thereof which projects at substantially right angles therefrom and is provided with a longitudinally extending slot 25. The pivot brackets 24 of the two grill plates are disposed alongside of each other in lapped relation in such a manner as to prevent relative endwise movement of said two grill plates and a pivot rod 26 extends through the several slots 25 and pivotally and adjustably connects said two grill plates together. Nuts 27 or other securing means are provided on the ends of the pivot rod 26. Handle members 28 are provided at each end of each grill plate at adjacent locations on the upright end members 22, whereby the two handle members at one end of the grill may be grasped in one hand and the two handle members at the other end of the grill may be grasped in the other hand when the grill is being handled while a piece of food is held therein. The two grill plates may be opened out like a book to permit insertion or removal of the food and said grill plates are automatically adjustable to the thickness of the food by reason of the slots 25 and pivot rod 26. In Fig. 2 I have shown a piece of food 30 held between said grill plates. The pivot rod 26 serves as a bottom support on which the lower edge of this food may rest.

The means for receiving, positioning and supporting the grill member mid way between the heating elements, regardless of the thickness of the food which is held within said grill member, constitutes an important part of this invention.

This means is in the nature of two grill guide units of duplicate construction mounted within the housing on the respective end walls 11, it being clearly shown in Fig. 4, that the ends of the heating element supports 19 and 20 are spaced far enough from the end walls 11 to allow room for the operation of these grill guide units.

Each of these grill guide units comprises two spaced apart guide bars 31 of angular cross sectional shape having lower parallel portions and divergent upper end portions 32. Each guide bar 31 has a bracket 33 rigidly secured thereto so as to extend at right angles to the guide bar. Each bracket 33 has two outwardly extending perforated ends 34, 34' which are slidably mounted on a horizontal track rod 35 whereby the guide bars 31 are guided for parallel movement toward and away from each other. The track rod 35 is supported by the out-turned ends 36 of a bracket 37 which is secured to the end wall 11 of the housing as by bolts 38. The guide bars 31 further rest against, and are guided by outwardly extending flanges 40 and 41 at the top and bottom edges of the bracket 37. The two guide bars 31 of each guide unit are urged toward each other by compression springs 42 on track bar 35. These springs 42 are interposed between the out-turned ends 34 of the brackets 33 and relatively fixed elements 43 on the supporting bracket 37. A stop member 44, which may be in the form of a relatively fixed portion of larger diameter than the track rod 35 on said rod between the two inner ends 34 of the brackets 33 serves to limit the inward movement of the guide bars 31. To provide for equal movements of the two guide bars 31 of each pair toward and away from the medial vertical plane of the broiler I connect each pair of guide bars 31 by means of a lever arm 45 and two links 47 and 48, the lever arm 45 being medially fulcrumed on a fixed pivot member 50 and the links being pivotally connected with the two respective guide bars 31 and with opposite ends of the lever arm 45. By reason of this connection it will be obvious that when one of the guide bars 31 is moved in one direction the other guide bar will be moved the same distance in the opposite direction. Bottom plates or stops 51 are provided at the lower ends of the guide bars for the grill member to rest on. The outwardly inclined upper ends of the guide bars are operatively positioned within the notches 16 in the top plates, which notches afford ample clearance for movement of the guide bars. It will be noted that the top plates 13 are bent downwardly at all edges. This provides a wider edge, affords a stronger construction and is more ornamental in appearance.

A removable drip pan 52 is preferably provided in the bottom of the broiler to catch grease and juices which may escape from meat or like food which is being broiled. The drip pan may be short enough to leave room for the entrance of electric wires through the bottom of the broiler at the inner end of the pan, as indicated at 52 in Fig. 2.

In the use of this broiler, the food to be broiled is placed between the grill plates, the handles 28 are grasped, one pair in each hand, the plates are pressed firmly against the food by the grip of the handles and the grill with the food therein is inserted from the top of the broiler, the handles 28 passing downwardly into the recesses 14 in the end walls 11 and protruding outwardly so that they may be readily grasped. The guide members 22 at each end of the grill enter between the divergent ends 32 of the guide members 31 and move said guide members apart as the grill is pressed down into the cooking position. The levers 45 and links 46 and 47 compel equal outward movement of the guide bars 31 of each pair, thus insuring correct positioning of the food mid way between the two heating elements whereby the two sides of the food will receive equal heat and be cooked evenly. This even centering of the food is an important feature because a relatively high heat is used to quickly sear and cook the food with a minimum loss of juices and if the food is not evenly centered between the two heating elements one side is liable to be burned and the other side not cooked enough. The heating elements are positioned relatively close to the food thus utilizing substantially all of the heat and insuring maximum efficiency. The refractory members 18 and 19 act as reflectors to direct the heat against the food and prevent excessive heating of the other parts of the broiler. The openings 14 and 15 permit free escape of steam and vapor and are thus conducive to more savory cooking.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In a broiler, a housing, two heating elements disposed in spaced apart parallel relation within said housing, a grill member of adjustable thickness movable into and out of said housing, movable guide members in the housing for receiving therebetween the grill member and movement equalizing devices connecting said movable guide members and compelling equal movement in opposite directions of the same.

2. In a broiler, a housing, two heating plates disposed in spaced apart upright parallel relation within said housing, said housing having a longitudinally extending opening in its top wall between the planes of said heating plates, a grill member of a width adjustable to the thickness of the food which is placed therein and arranged to be inserted and removed through said opening, movable guide members in the housing for receiving therebetween the grill member and movement equalizing devices connecting said movable guide members and compelling equal movement in opposite directions of the same for supporting the grill member mid way between the heating elements.

3. In a broiler, a rectangular housing, two electric heating elements disposed in upright parallel spaced apart planes within said housing, said housing having an opening extending across the top thereof between the planes of said heating elements and having openings in both ends extending from the top edge downwardly in alignment with said top opening, a grill member of a width adjustable to the thickness of the food which is placed therein insertable through said top opening and embodying two open work grill plates and two adjacent handles connected with the respective grill plates at each end of the grill member and movable into and out of said end openings, movable guide members in the housing for receiving therebetween the grill member and movement equalizing devices connecting said movable guide members and compelling equal movement in opposite directions of the same.

4. In an electric broiler, a housing having an opening extending across the top thereof, two electric heating elements disposed in spaced apart upright parallel relation within said housing on opposite sides of said top opening, a two plate grill member of automatically adjustable width arranged to be inserted through said top opening, and resiliently supported movable guide means of variable width within each end of said housing for receiving said grill member, said guide means urging said grill plates together and supporting said grill mid way between said heating elements.

5. In an electric broiler, a housing having an opening extending across the top thereof, two electric heating elements disposed in spaced apart upright parallel relation within said housing on opposite sides of said top opening, a grill member embodying two open work grill plates arranged to receive therebetween the food to be broiled, said grill member being insertable and removable through said top opening and yieldingly supported guide means within said housing for receiving and holding said grill member whereby said two grill plates will be yieldingly urged against the food.

6. In an electric broiler, a housing having an opening extending across the top thereof, two electric heating elements disposed in spaced apart upright parallel relation within said housing on opposite sides of said top opening, a grill member embodying two open work grill plates movable toward and away from each other to receive therebetween the food to be broiled, said grill member being insertable and removable through said top opening, a pair of parallel guide members at each end of said housing for receiving therebetween the ends of said grill plates, means yieldingly urging the two guide members of each pair together and means compelling equal movement in opposite directions of the two guide members of each pair.

7. In an electric broiler, a rectangular housing having a slot like opening extending across the top thereof, two electric heating elements disposed in said housing in spaced apart upright parallel planes on opposite sides of said top opening, two upright guide members of angle shaped cross section mounted in each end of said housing at the ends of said heating elements the upper ends of the two guide members of each pair being inclined away from each other, means supporting the guide members of each pair for movement toward and away from each other, springs urging said guide members together, means connecting the two guide members of each pair whereby equal movement in opposite directions will be compelled, and a grill member capable of holding food and insertable between said guide members and through said top opening.

8. In an electric broiler, a rectangular housing having a slot like opening extending across the top thereof, two electric heating elements disposed in said housing in spaced apart upright parallel planes on opposite sides of said top opening, two upright guide members of angle shaped cross section mounted in each end of said housing at the ends of said heating elements the upper ends of the two guide members of each pair being inclined away from each other, a transverse track rod supported by each end of the housing, a bracket on each of said guide members slidable on the adjacent track rod, spring means urging the two guide members of each pair together, stop means limiting the movement toward each other of the two guide members of each pair, link and lever means interconnecting the two guide members of each pair for compelling simultaneous movement in opposite directions of each guide member, and a grill member capable of holding food and insertable between said guide members and through said top opening.

9. In an electric broiler, a rectangular housing having a slot like opening extending across the top thereof, two electric heating elements disposed in said housing in spaced apart upright parallel planes on opposite sides of said top opening, two upright guide members of angle shaped cross section mounted in each end of said housing at the ends of said heating elements, means supporting the guide members of each pair for sidewise movement toward and away from each other, means yieldingly urging the two guide members of each pair toward each other, a lever arm disposed between the two guide members of each pair and medially fulcrumed on a fixed pivot, two links connecting the respective ends of the lever arm with the guide members and a food holding grill insertable in said guide members.

10. A grill member for a broiler embodying two open work grill plates, bracket members extending at right angles from said two grill plates at one edge longitudinal slots in said brackets, pivot means extending through said slots pivotally connecting said grill plates together and allowing movement of said grill plates toward and away from each other and handles provided on the ends of said grill plates and extending outwardly in pairs from each end of said grill member.

The foregoing specification signed at Seattle, Wash., this 1st day of June 1931.

ALLEN BYRON CODLING.